(12) United States Patent
Frederiksen et al.

(10) Patent No.: US 12,279,608 B2
(45) Date of Patent: Apr. 22, 2025

(54) CARBON FIBER STRUCTURE, AND A METHOD FOR FORMING THE CARBON FIBER STRUCTURE

(71) Applicant: SA EXEL INDUSTRIES, Epernay (FR)

(72) Inventors: Casper Louis Frederiksen, Sakskøbing (DK); Lars Nejsum, Vedbæk (DK)

(73) Assignee: SA EXEL INDUSTRIES, Epernay (FR)

( * ) Notice: Subject to any disclaimer, the term of this patent is extended or adjusted under 35 U.S.C. 154(b) by 446 days.

(21) Appl. No.: 17/772,889

(22) PCT Filed: Oct. 28, 2020

(86) PCT No.: PCT/EP2020/080287
§ 371 (c)(1),
(2) Date: Apr. 28, 2022

(87) PCT Pub. No.: WO2021/083960
PCT Pub. Date: May 6, 2021

(65) Prior Publication Data
US 2022/0408714 A1    Dec. 29, 2022

(30) Foreign Application Priority Data
Oct. 30, 2019  (DK) .......................... PA 2019 70672

(51) Int. Cl.
*A01M 7/00*   (2006.01)
*B05B 1/20*   (2006.01)
(Continued)

(52) U.S. Cl.
CPC ............. *A01M 7/0071* (2013.01); *B05B 1/20* (2013.01); *B29C 53/56* (2013.01); *B29C 70/34* (2013.01);
(Continued)

(58) Field of Classification Search
CPC ........... B29L 2031/001; B29L 2031/06; B29L 2031/30; B05B 1/20; B05B 1/205;
(Continued)

(56) References Cited

U.S. PATENT DOCUMENTS 1,645,060 A * 10/1927  Kraft .......................... E04C 3/09
 52/634
2,593,714 A *  4/1952  Robinson ................ B29C 49/44
 156/65

(Continued)

FOREIGN PATENT DOCUMENTS

AR       048007 A    3/2006
AU     2 759167 A    4/1970
(Continued)

OTHER PUBLICATIONS

U.S. Appl. No. 17/772,905, filed Apr. 28, 2022.
(Continued)

*Primary Examiner* — Michael C Romanowski
(74) *Attorney, Agent, or Firm* — Crowell & Moring LLP

(57) ABSTRACT

A carbon fiber boom structure for an agricultural sprayer boom, the boom structure including an elongated upper carbon fiber tube, at least one elongated lower carbon fiber and a carbon fiber/resin matrix uniting structure bonded to each of the carbon fiber tubes to hold the tubes in a spaced apart position. The uniting structure being formed in a winding operation by applying windings of a carbon fiber string with a liquid resin around portions of the tubes, the windings and resin matrix defining an inner primary layer and an outer primary layer, wherein the inner primary layer is bonded to a surface portion of each tube while the outer primary layer is bonded to a remaining surface portion of each tube to completely, or essentially completely, envelope each tube by the portions of the two primary layers.

10 Claims, 7 Drawing Sheets

(51) Int. Cl.
  *B29C 53/56*   (2006.01)
  *B29C 53/58*   (2006.01)
  *B29C 70/34*   (2006.01)
  *B29C 70/84*   (2006.01)
  *B29K 307/04*  (2006.01)
  *B29L 31/00*   (2006.01)

(52) U.S. Cl.
  CPC .......... *B29C 70/845* (2013.01); *B29C 53/564* (2013.01); *B29C 53/582* (2013.01); *B29K 2307/04* (2013.01); *B29L 2031/001* (2013.01)

(58) Field of Classification Search
  CPC ........... B05B 1/207; E04C 3/02; B29C 70/04; B29C 70/06; B29C 53/56–785; A01M 7/0071
  USPC .............................................. 428/34.1–36.92
  See application file for complete search history.

(56) References Cited

U.S. PATENT DOCUMENTS

| | | | |
|---|---|---|---|
| 3,551,237 A * | 12/1970 | Cox ...................... | B29C 53/824 |
| | | | 52/693 |
| 3,665,670 A | 5/1972 | Rummler | |
| 3,798,864 A * | 3/1974 | Georgii ................... | E04C 5/065 |
| | | | 52/223.14 |
| 3,814,320 A | 6/1974 | Skurray | |
| 4,137,354 A * | 1/1979 | Mayes, Jr. ............. | B29C 70/382 |
| | | | 428/36.1 |
| 4,241,117 A * | 12/1980 | Figge ........................ | E04C 2/36 |
| | | | 156/433 |
| 4,539,785 A * | 9/1985 | Overbo ..................... | E04C 3/36 |
| | | | 52/309.1 |
| 4,566,247 A * | 1/1986 | Overbo ..................... | E04C 3/28 |
| | | | 52/843 |
| 4,695,342 A * | 9/1987 | Belleau ................. | B29C 53/564 |
| | | | 156/173 |
| 4,711,398 A * | 12/1987 | Ganderton .......... | A01M 7/0071 |
| | | | 428/218 |
| 4,880,160 A | 11/1989 | Patterson et al. | |
| 5,310,115 A | 5/1994 | Broyhill | |
| 5,332,178 A * | 7/1994 | Williams .............. | B29C 70/446 |
| | | | 244/133 |
| 5,971,295 A * | 10/1999 | Jensen .................. | A01M 7/006 |
| | | | 239/587.5 |
| 5,992,759 A | 11/1999 | Patterson | |
| 6,082,068 A * | 7/2000 | Fisher ....................... | E04C 3/28 |
| | | | 52/651.03 |
| 6,837,446 B1 | 1/2005 | Jesse | |
| D511,875 S | 11/2005 | Wubben et al. | |
| 6,966,501 B2 * | 11/2005 | Wubben .............. | A01M 7/0071 |
| | | | 52/646 |
| 8,313,600 B2 * | 11/2012 | Wilson .................. | G06F 3/0421 |
| | | | 156/169 |
| 8,347,572 B2 | 1/2013 | Piedmont | |
| 8,646,702 B2 | 2/2014 | Barker | |
| 8,746,589 B2 | 6/2014 | Barker et al. | |
| 8,899,496 B2 | 12/2014 | Wissler et al. | |
| 8,939,383 B2 | 1/2015 | Honermann et al. | |
| 9,155,295 B2 | 10/2015 | Bouten | |
| 9,258,989 B2 | 2/2016 | Barker et al. | |
| D753,729 S | 4/2016 | Ponzinibbio | |
| 9,404,249 B2 | 8/2016 | Langone et al. | |
| 9,462,799 B2 | 10/2016 | Bouten | |
| 9,828,771 B2 | 11/2017 | Barker et al. | |
| 9,839,211 B2 | 12/2017 | DePriest et al. | |
| 9,848,592 B2 | 12/2017 | Peters et al. | |
| 9,925,554 B2 | 3/2018 | Claussen et al. | |
| 10,010,026 B2 | 7/2018 | Honermann et al. | |
| 10,085,437 B2 | 10/2018 | Mariani et al. | |
| 10,220,578 B2 * | 3/2019 | Konrad ................... | B29C 70/46 |
| 10,258,028 B2 | 4/2019 | Pilney | |
| 10,645,916 B2 | 5/2020 | Murphy et al. | |
| 10,806,105 B2 | 10/2020 | Murphy | |
| 11,076,588 B2 | 8/2021 | Mariani et al. | |
| 11,766,036 B2 * | 9/2023 | Bittner ................ | A01M 7/0053 |
| | | | 239/159 |
| 11,858,201 B2 * | 1/2024 | Valembois ............ | B29C 70/347 |
| 2002/0026765 A1 * | 3/2002 | Vahey ........................ | E04C 3/29 |
| | | | 52/843 |
| 2003/0064187 A1 * | 4/2003 | Blanchette ................ | B32B 1/08 |
| | | | 428/36.9 |
| 2005/0115186 A1 * | 6/2005 | Jensen .................... | E01F 9/696 |
| | | | 52/633 |
| 2005/0126106 A1 * | 6/2005 | Murphy ................ | B64G 1/2224 |
| | | | 52/652.1 |
| 2006/0201075 A1 * | 9/2006 | Rivas .................. | A01M 7/0071 |
| | | | 52/111 |
| 2008/0223986 A1 | 9/2008 | Kaye | |
| 2010/0065667 A1 * | 3/2010 | Vacek-Vesely ........... | B05B 1/20 |
| | | | 239/723 |
| 2011/0147487 A1 | 6/2011 | Wissler et al. | |
| 2012/0225237 A1 * | 9/2012 | Brockwell ............... | D03D 3/00 |
| | | | 428/68 |
| 2012/0266561 A1 | 10/2012 | Piedmont | |
| 2012/0273590 A1 | 11/2012 | Honermann et al. | |
| 2012/0273626 A1 | 11/2012 | Bouten | |
| 2013/0062432 A1 | 3/2013 | Barker et al. | |
| 2013/0092753 A1 | 4/2013 | Barker | |
| 2013/0180194 A1 * | 7/2013 | Langone .................. | E04C 3/28 |
| | | | 52/650.1 |
| 2013/0291476 A1 * | 11/2013 | Broughton, Jr. ........ | D02G 3/385 |
| | | | 29/897 |
| 2013/0291709 A1 * | 11/2013 | Woods .................... | B29C 53/58 |
| | | | 87/9 |
| 2014/0182232 A1 * | 7/2014 | Holt ........................ | F03D 13/20 |
| | | | 52/645 |
| 2014/0231543 A1 | 8/2014 | Barker et al. | |
| 2014/0366460 A1 | 12/2014 | Peters et al. | |
| 2015/0076244 A1 | 3/2015 | Wissler et al. | |
| 2015/0122911 A1 | 5/2015 | Honermann et al. | |
| 2015/0201552 A1 | 7/2015 | Bouten | |
| 2016/0037764 A1 | 2/2016 | DePriest et al. | |
| 2016/0115692 A1 | 4/2016 | Barker et al. | |
| 2016/0121355 A1 | 5/2016 | Claussen et al. | |
| 2016/0286781 A1 * | 10/2016 | Mariani .................. | B05B 1/185 |
| 2016/0309696 A1 | 10/2016 | Pilney | |
| 2017/0000103 A1 * | 1/2017 | Wissler ................ | A01M 7/0075 |
| 2017/0015401 A1 | 1/2017 | Kaye | |
| 2017/0216871 A1 * | 8/2017 | Klemp, Jr. ............. | B05B 15/628 |
| 2018/0056610 A1 * | 3/2018 | Osborne ................ | B29C 70/386 |
| 2018/0251980 A1 * | 9/2018 | Oldroyd ................ | B29C 70/24 |
| 2018/0258642 A1 * | 9/2018 | Asay ........................ | E04C 3/28 |
| 2018/0281010 A1 | 10/2018 | Claussen et al. | |
| 2019/0098846 A1 * | 4/2019 | Murphy .................. | B32B 5/024 |
| 2019/0098888 A1 | 4/2019 | Murphy et al. | |
| 2019/0098889 A1 | 4/2019 | Mariani et al. | |
| 2019/0281807 A1 | 9/2019 | Gautron et al. | |
| 2019/0357519 A1 * | 11/2019 | Castro ................ | A01M 7/0075 |
| 2020/0163323 A1 | 5/2020 | Mariani et al. | |
| 2020/0390080 A1 * | 12/2020 | Bittner ................ | A01M 7/0075 |
| 2020/0404867 A1 | 12/2020 | Murphy | |
| 2021/0229757 A1 * | 7/2021 | Gralka .................... | B29C 70/16 |
| 2022/0217965 A1 * | 7/2022 | Soliman ................ | A01M 7/006 |

FOREIGN PATENT DOCUMENTS

| | | | | |
|---|---|---|---|---|
| BR | 10 2012 022674-0 A2 | 10/2013 | | |
| BR | 10 2012 025989-3 A2 | 11/2013 | | |
| BR | 102015019128-6 A2 | 6/2016 | | |
| BR | 102016015344-1 A8 | 1/2017 | | |
| BR | 102018005574-7 A2 | 10/2018 | | |
| BR | 102018070306-4 A2 | 4/2019 | | |
| BR | 102018070317-0 A2 | 4/2019 | | |
| CA | 2 757 090 A1 | 10/2012 | | |
| CA | 2 841 022 A1 | 12/2014 | | |
| CZ | 17125 U1 | 1/2007 | | |
| CZ | 307704 B6 | 2/2019 | | |
| DE | 19527197 A1 * | 1/1997 | .......... | B29C 70/205 |
| DE | 103 38 380 A1 | 3/2005 | | |
| DE | 10 2009 059 111 A1 | 6/2011 | | |
| EP | 0 191 637 A2 | 8/1986 | | |

(56) References Cited

FOREIGN PATENT DOCUMENTS

| EP | 2 514 884 A1 | 10/2012 | |
|----|----|----|----|
| EP | 3 466 258 A1 | 4/2019 | |
| FR | 2 595 270 A1 | 9/1987 | |
| FR | 2662579 A1 * | 5/1990 | ............ A01M 7/00 |
| FR | 2 643 831 A1 | 9/1990 | |
| FR | 2 622 579 A1 | 12/1991 | |
| FR | 2 744 786 A1 | 8/1997 | |
| FR | 2 853 207 A1 | 5/2005 | |
| GB | 201122306 A | 12/2011 | |
| JP | 2019004831 A | 1/2019 | |
| WO | WO 99/49150 A1 | 9/1999 | |
| WO | WO 2006/061617 A1 | 6/2006 | |
| WO | WO 2012/149516 A1 | 11/2012 | |
| WO | WO 2013/092272 A1 | 6/2013 | |
| WO | WO 2015/067829 A1 | 5/2015 | |

OTHER PUBLICATIONS

International Search Report dated Feb. 10, 2021 out of PCT Priority Application PCT/EP2020/080287 (5 pages).
Written Opinion of the International Search Authority dated Feb. 10, 2021 out of PCT Priority Application PCT/EP2020/080287 (5 pages).
International Preliminary Report on Patentability dated May 3, 2022 from PCT Priority Application PCT/EP2020/080287 (8 pages).
Office Action dated Apr. 2, 2020 out of Danish Priority Application PA 2019 70672 (7 pages).

* cited by examiner

CARBON FIBER STRUCTURE, AND A METHOD FOR FORMING THE CARBON FIBER STRUCTURE

BACKGROUND OF THE INVENTION

Field of Invention

This application is a national application based on Patent Cooperation Treaty Patent Application No. PCT/EP2020/080287, filed on Oct. 28, 2020, the entire contents of which are incorporated herein by reference.

This application claims under 35 U.S.C. § 119(a) the benefit of the filing date of Danish Patent Application No. PA 2019 70672, filed on Oct. 30, 2019, the entire contents of which are incorporated herein by reference.

The present invention relates in particular to agricultural sprayers where a two- or three-dimensional carbon fiber structure defines a sprayer boom section including parallel, or essentially parallel, carbon fiber tubes and a uniting carbon fiber/epoxy structure bonded to each tube.

Description of Related Art

Specifically, the uniting structure of the invention is formed in a winding operation and holds the parallel tubes in a spaced apart position, serving also to transfer forces between the tubes, as in a lattice structure. A plurality of such uniting structures defining respective joints are along the length of the sprayer boom section.

Sprayer boom sections including a plurality of relatively short length carbon fibre tubes joined lengthwise via uniting structures are known from, eg., U.S. Pat. No. 9,839,211. Connecting carbon fiber tubes to each other via a connector body and a connector device using glue is known from, eg., WO99/49150.

The object of the present invention is to provide a uniting structure or joint that is easy to manufacture using the method also claimed herein, which uniting structure may define in part an agricultural sprayer boom section of the aforementioned type, such as of the type where the carbon fibre tubes are each prefabricated to have a length corresponding to the full length of the boom section or part length thereof.

DETAILED DESCRIPTION

The invention will now be explained in more detail by reference to an embodiment, and to a use thereof.

Figure 1A:
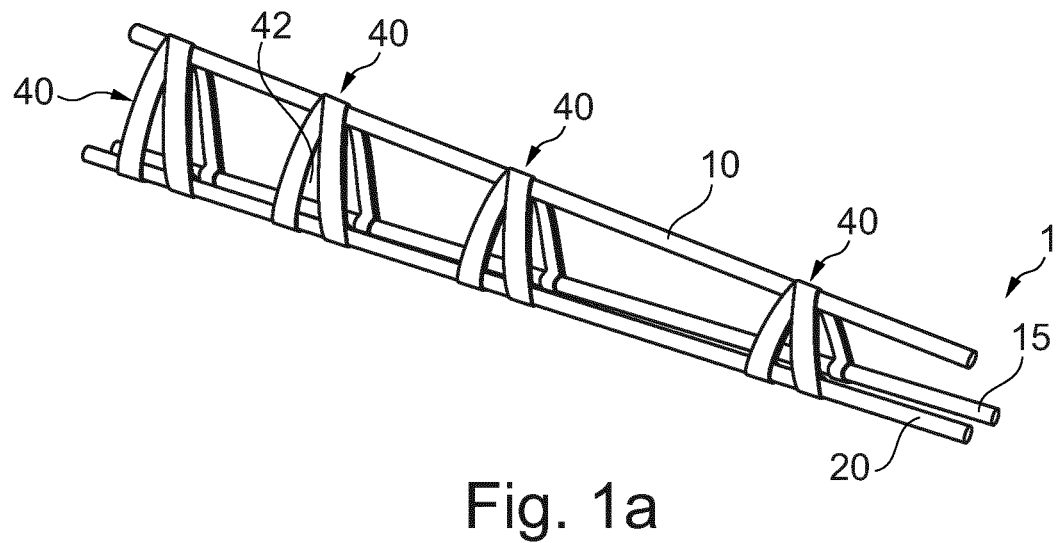
FIG. 1a is a perspective, partial and schematic view of an embodiment of a three dimensional light-weight carbon fiber structure in accordance with the present invention.

FIG. 1a is a perspective, partial and schematic view of a three-dimensional light-weight carbon fiber structure including carbon fiber upper and lower tubes 10, 15, 20 and configured for forming a section 1 of a sprayer boom which is part of an agricultural sprayer.

Figure 1B:
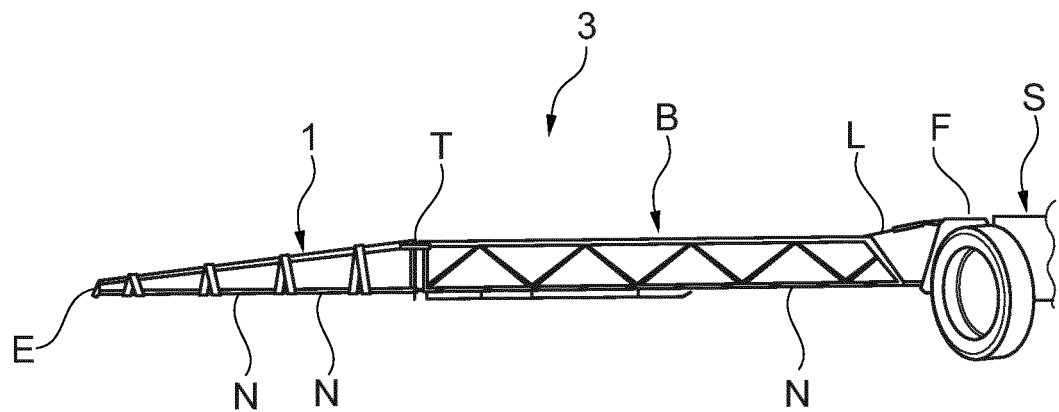
FIG. 1b shows, schematically, an embodiment of an agricultural sprayer boom extending from one side of a frame in accordance with the present invention.

FIG. 1b shows, in part, an embodiment of such an agricultural sprayer, which also includes a tractor driven or carried tank S for containing a liquid spraying agent, the tank S being supported by a frame F, normally provided with supporting wheels, of which only one is shown. The sprayer boom normally includes two similar parts that extend outwards from a respective side of the frame F.

FIG. 1b shows one such part of the boom extending from one side of the frame F and which has an outer end E; for convenience, in the following, the shown boom part will simply be referred to as a boom, and be designated numeral 3.

The boom 3 shown in FIG. 1b carries pipes (not shown) connecting the tank S with nozzles N for delivering the spraying agent and being arranged spaced apart along the length of the boom 3. The spraying agent is, as is conventional, delivered from the tank S using a suitable pump (not shown) mounted on the aforementioned frame F.

The shown boom 3 is, as is conventional for agricultural sprayer booms, supported by the frame F via a link L that allows the boom 3 to be turned into a non-operative position where it extends alongside the tank S in a direction of travel of the agricultural sprayer. In FIG. 1b the boom 3 is shown as being formed by two individual sections, one being the section 1 shown in FIG. 1a and the other one being a relatively heavy three-dimensional metal lattice structure B, or a light weight three-dimensional lattice structure B such as of aluminum or carbon, connected at one end to the frame F via the aforementioned link L. The light-weight carbon fiber fibre-section 1 which defines the boom outer end E at its one end, is connected with the metal structure B at its other end via at least one connector device T.

Figure 1C:
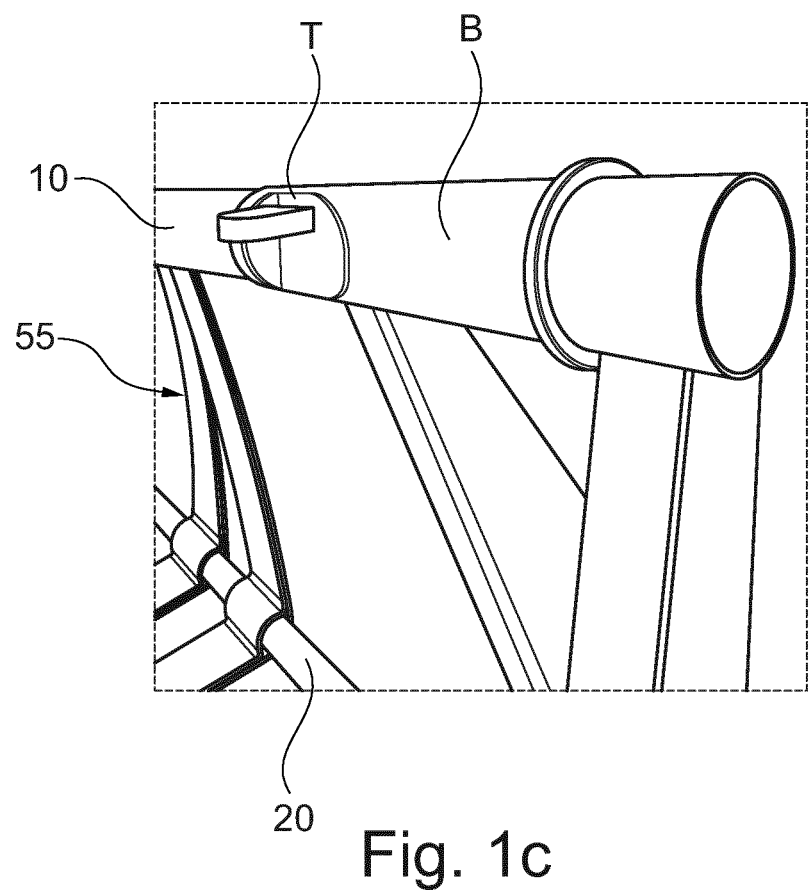
FIG. 1c shows highly schematically an embodiment of a connector between the structure of FIG. 1a and a metal structure of the sprayer boom of FIG. 1b in accordance with the present invention.

The connector device T is shown highly schematically in FIG. 1c, and is typically a metal body. The connector device T allows for the carbon fiber section 1 to be supported by the metal structure B, and may itself be configured to allow for the light-weight section 1 to be turned relative to the metal structure B to allow for the two structures 1, B to be folded against each other, to reduce the overall length of the boom 3 when in its non-operative position alongside the tank S. Often a connector device T will connect the shown upper tube 10 of the section 1 with an upper lattice member of the metal structure B, while similar connectors will connect each of the shown two lower tubes 15, 20 with respective lower lattice members of the metal structure B.

Where the carbon fiber section 1 is connected directly to the frame F, as where no metal structure B is used, the connector device T may include, or be connected to, the aforementioned link L at the frame F. The connector device T may be welded to or otherwise secured to the metal structure B or to the frame F, as the case may be.

Figure 1D:
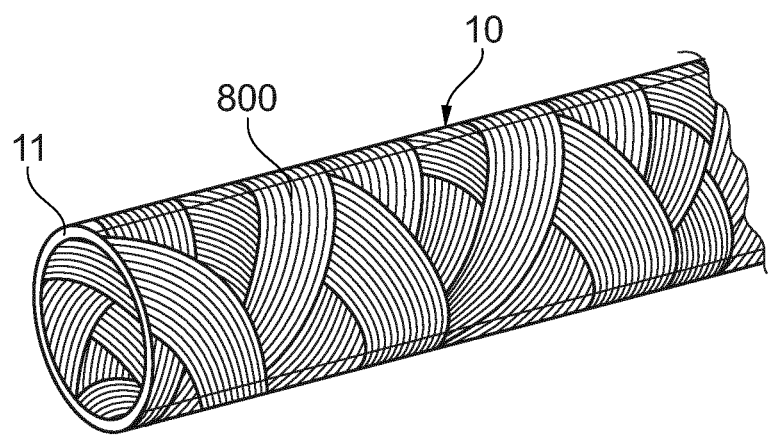
FIG. 1d shows schematically a perspective view of the end portion of a prior art elongated hollow cylindrical carbon fiber tube.

In FIG. 1d is schematically shown a perspective view of the end portion of an elongated hollow cylindrical carbon fibre tube. Such a tube defines each one of the shown elongated tubes 10, 15, 20 that form the three-dimensional carbon fiber structure or section 1 wherein the upper tube 10 may preferably converge towards the two lower tubes 15, 20 at the end E of the boom 3.

Preferably, the tubes 10, 15, 20 have been made with a length corresponding to that of the carbon fiber section 1, or in several parts forming together the full length of the section 1.

Generally, each elongated tube 10, 15, 20 is a carbon fiber/epoxy tube, that may be formed by spiral winding a carbon fiber string 800 in alternate directions around a mandrel that defines the internal diameter of the tube 10, 15, 20, with the total thickness of the tube 10, 15, 20 being determined by the thickness of the windings. As explained in WO99/49150, such tubes are cured to provide maximum mechanical properties. To allow for subsequent pulling off of the finished tube from the mandrel a slip agent is normally applied to the mandrel.

Figure 1E:
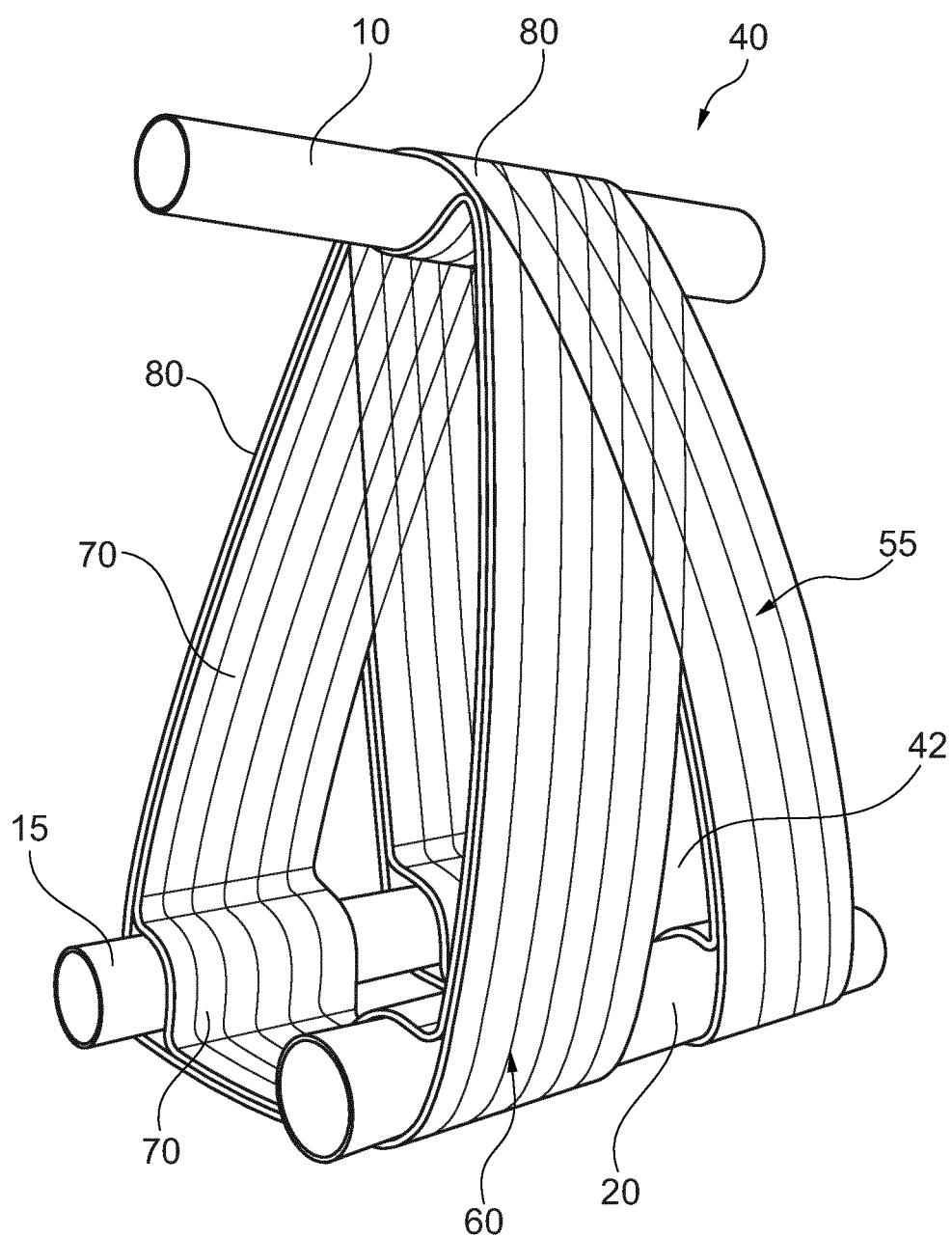
FIG. 1e shows in a perspective view an embodiment of a uniting carbon fiber/epoxy structure as shown in FIG. 1a, FIG. 1f shows the uniting structure of FIG. 1e as seen from the side.
Figure 1F:
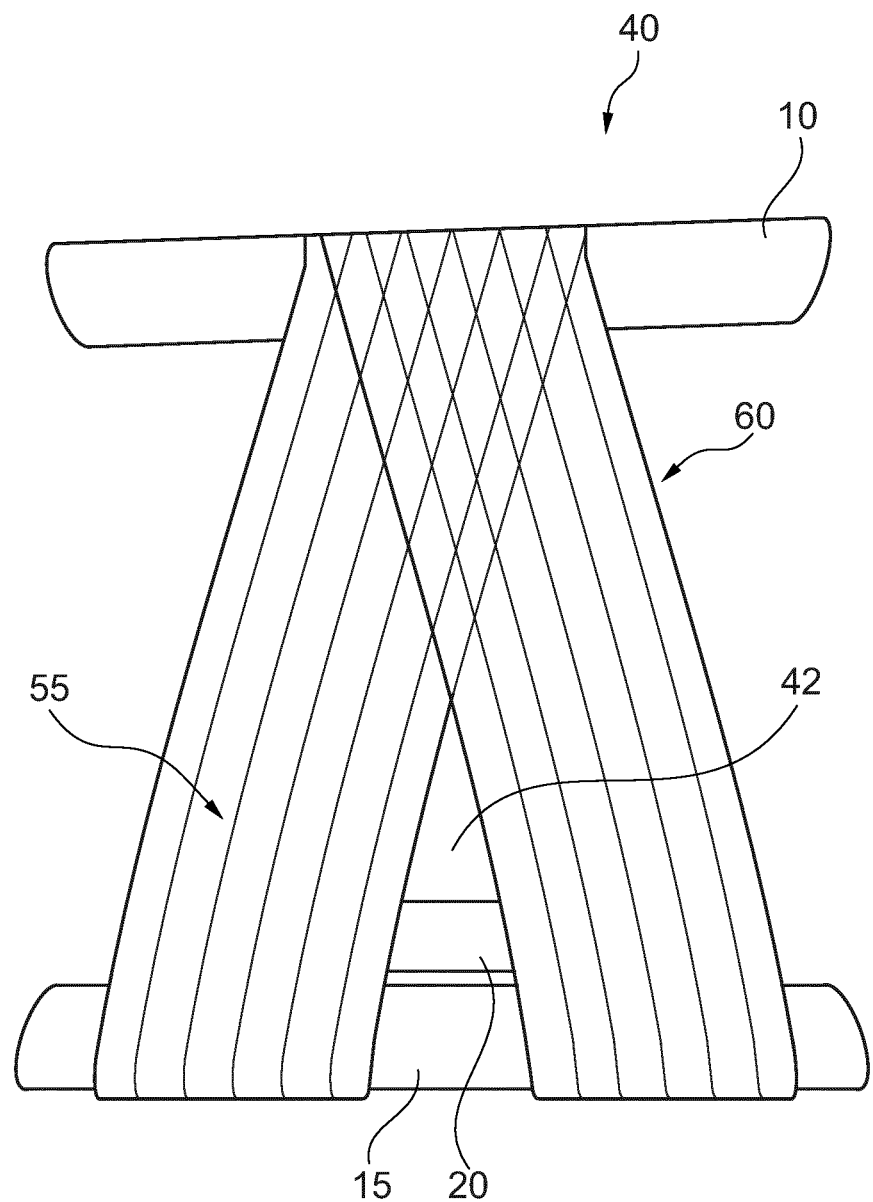
FIGS. 1g and 1h show alternative embodiments of the uniting structure of FIG. 1e.

FIG. 1e shows an embodiment of a hollow, uniting carbon fiber/epoxy structure 40 bonded to each of three carbon fiber tubes 10, 15, 20 to form a light weight carbon fiber section 1 as shown in FIG. 1a. The uniting structure 40 is formed in a winding operation by winding a many meters long carbon fiber string with a liquid epoxy coating around portions of the tubes 10, 15, 20, as explained further below, and holds when cured the three tubes 10, 15, 20 in a spaced apart position, serving also to transfer forces between the tubes 10, 15, 20, as in a lattice structure. A plurality of such uniting structures 40 define respective tube joints along the length of the section 1. The aforementioned nozzles N may be carried by one of the lower tubes 15, 20.

The uniting structure 40 of FIG. 1e has layered carbon fiber legs 55, 60 that converge towards the top tube 10 of the carbon fiber structure 1, with two primary layers 70, 80 of each leg 55, 60 being bonded to respective portions of the periphery of each tube 10, 15, 20. Specifically, an inner one 70 of the two primary layers contacts a portion of each tube 10, 15, 20 oriented towards the inside of the uniting structure 40 while an outer one 80 contacts the remaining portion of each tube 10, 15, 20 that is oriented towards the outside of the uniting structure 40. In this manner the tubes 10, 15, 20 are essentially completely enveloped by the two layers 70, 80, and bonded thereto. The bond is established after completion of the winding operation in that the carbon fiber string epoxy/resin coating is cured to thereby not only bind the fiber windings that define the uniting structure 40 to each other but also to bond the uniting structure 40 to the tubes 10, 15, 20.

As will be understood, each of the shown primary layers 70, 80 is normally build up from a plurality of sublayers, each formed by adjacent windings of the carbon fibre string, that together define the thickness of the respective primary layer 70, 80. Where the two legs 55, 60 meet, the carbon fiber string is arranged to cross over a portion of the carbon fiber string previously laid out during the winding procedure, as shown schematically in FIG. 1e, such that the uniting structure appears as a monolithic structure in the region where the two legs 55, 60 meet. This stands in contrast to the embodiment shown in FIG. 1h where the two converging legs 55, 60 are not integrated at the top tube 10.

The legs 55, 60 are in the shown embodiment spaced apart where they connect to the two lower tubes 15, 20. This allows i.a. for the aforementioned nozzles N to be positioned also in the area of the uniting structure 40, namely in the gap between the legs 55, 60 and between the lower tubes 15, 20, allowing for spraying agent to be discharged downwards onto a crop without the uniting structure 40 interfering with the spraying pattern. A most narrow part of the gap is shown in FIG. 1e by numeral 42.

Figure 1G:
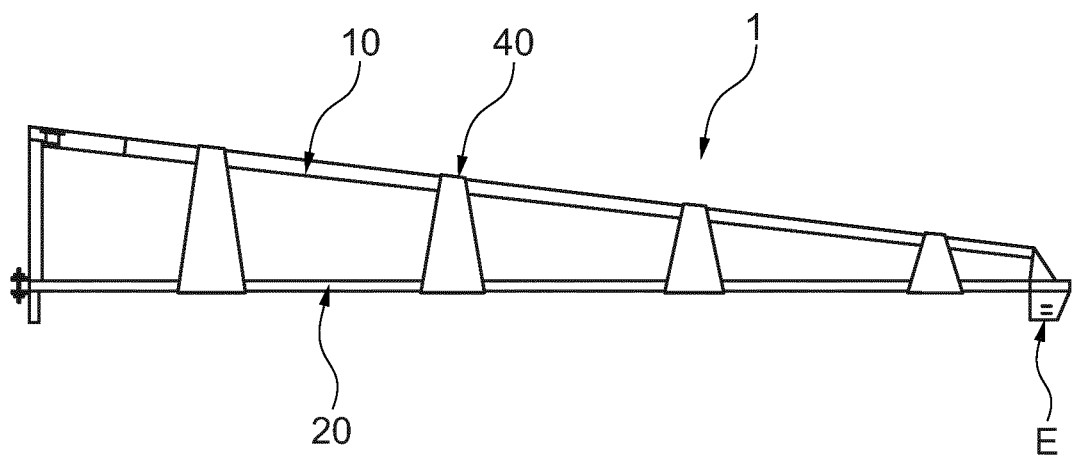
Figure 1H:
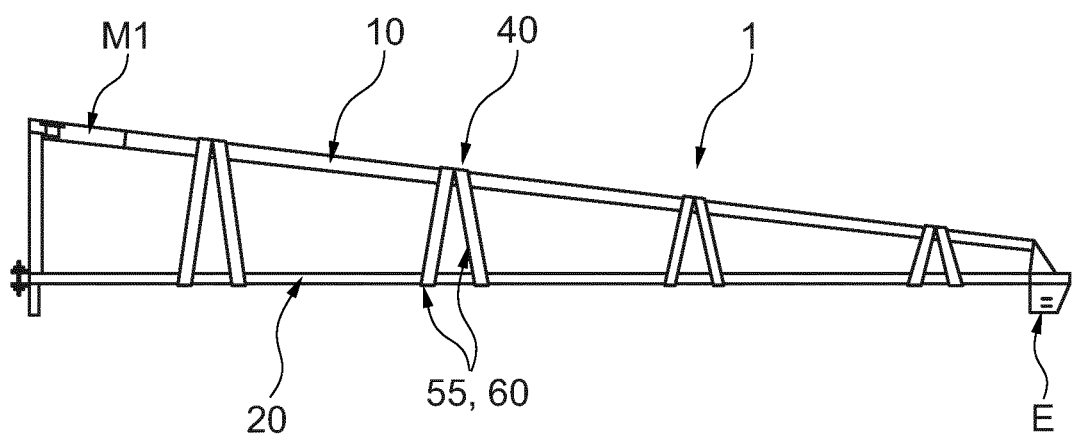

In another embodiment, as shown in FIG. 1g the uniting structure 40 does not included spaced apart legs and appears as a single monolithic structure. The boom sections 1 shown in FIGS. 1b, 1g and 1h may be 2-dimensional, or 3-dimensional as the boom section 1 shown in FIG. 1a.

Figure 2A:
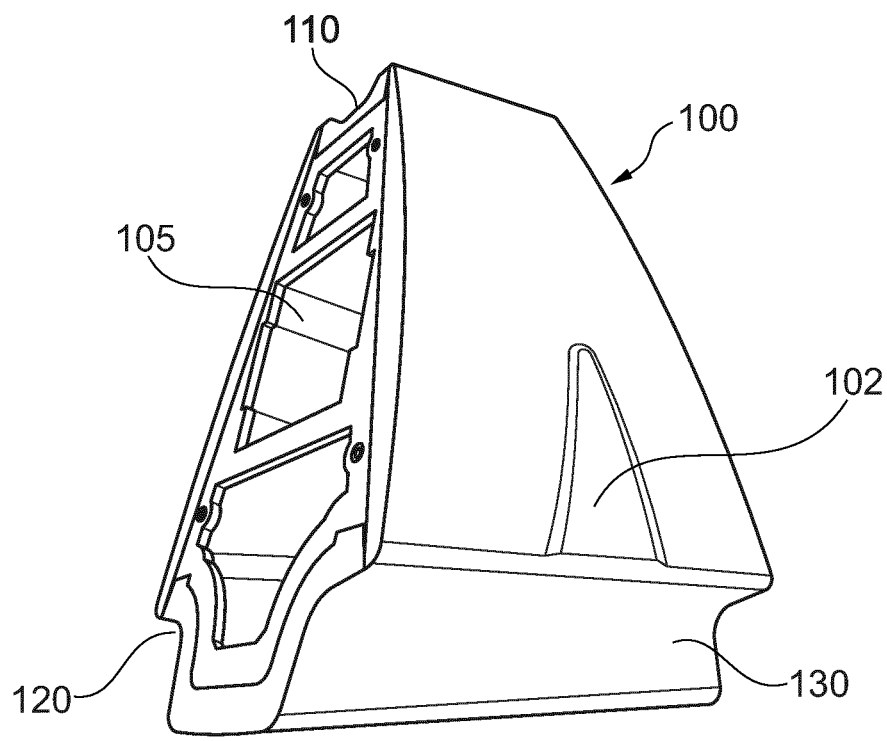
FIG. 2a is a perspective view showing an embodiment of a core device used for making the uniting structure of FIG. 1e in accordance with the present invention.

Turning now to FIG. 2a there is shown a perspective view of a core device 100 used for making the uniting structure of FIGS. 1f-1h, and FIG. 2b shows the core device 100 in a manufacturing facility, mounted onto an elongated rotating axle 400 carrying along its length a plurality of spaced apart core devices 100. The core device 100 has a through-going opening 105 for receiving the elongated axle 400, and has on its periphery a number of elongated recesses 110, 120, 130. The core device 100 may also be provided with a projecting area 102 configured for forming the aforementioned gap 42 in that the carbon fiber string 800 is not wound onto this projecting area 102. A slip agent is preferably applied to the surface of the core device 100 to allow removal therefrom of the finished unifying structure 40.

Figure 2B:
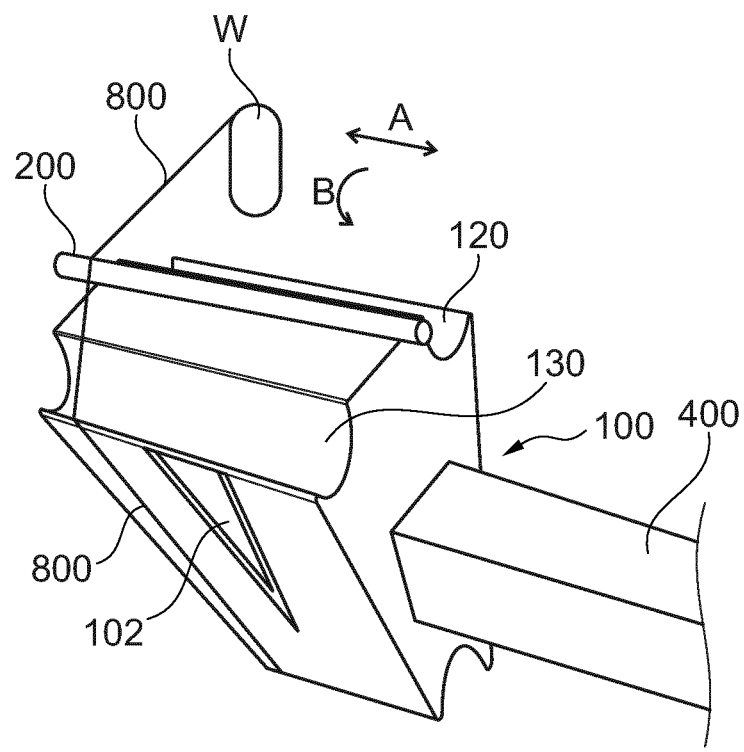
FIG. 2b shows the core device of FIG. 2a mounted onto a rotary device carrying along its length a plurality of spaced apart core devices of the type shown in FIG. 2a, and FIGS. 3a-3f show various steps during the making of the uniting structure of FIG. 1e using the rotary device shown in FIG. 2b.

FIG. 2b shows an initial step during the making of the unifying structure 40, more specifically during the winding of the portion of a carbon fiber string 800 forming the inner primary layer 70. It will be understood that the winding procedure takes place in that the axle 400 is rotated about its longitudinal axis, thereby rotating the core device 100 about the same axis while unwinding the carbon fiber string 800 from a supply W, such as a spool, which rotates also, as indicated by the arrow B in FIG. 2b. The winding procedure is preferably such that the supply W moves also sideways back and forth in the directions indicated by arrows A in FIG. 2b.

FIG. 2b shows also one embodiment of a removable spacer device 200, the overall purpose of which is to ensure that the inner primary layer 70 is wound about the core device 100 with a certain slack where portions of the primary layer 70 bridge the recesses 110, 120, 130.

Figure 3A:
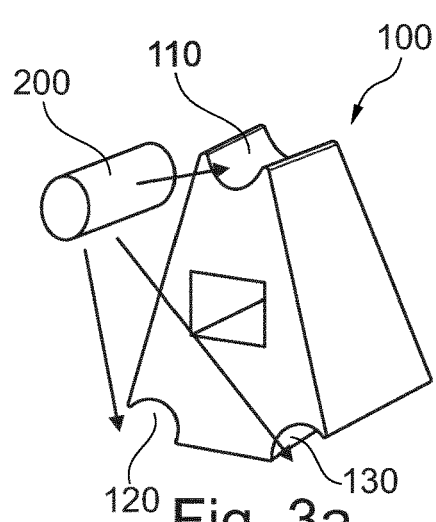

FIG. 3a again shows the core device 100 operated in a manufacturing facility, and with an alternative spacer device including in this case three tubular pieces 200, each to be received in a respective one of the three elongated recesses 110, 120, 130 having preferably a shape complementary with the tubes 10, 15, 20. The tubular pieces 200 are, like the device 200 shown in FIG. 2b, preferably provided with a slip agent, such as Teflon, allowing removal of the spacer device(s) 200 from the core device 100 once winding of the inner primary layer 70 around the core device 100 has been completed.

Figure 3B:
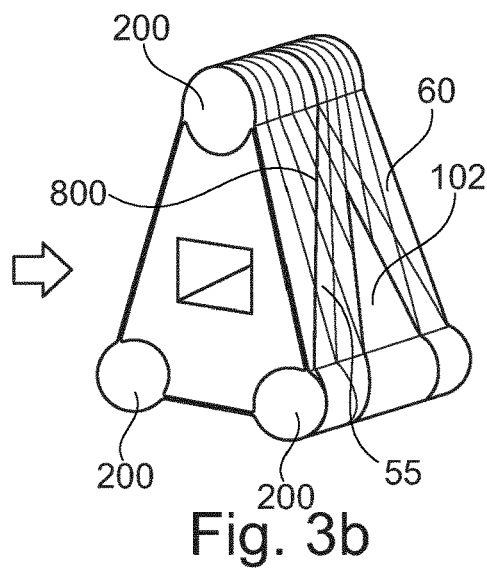
Figure 3C:
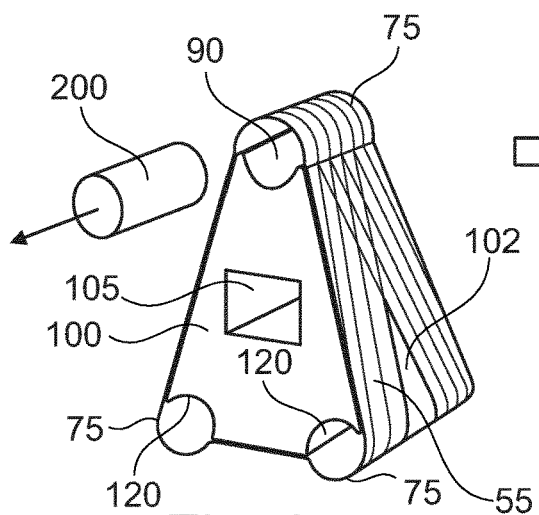
Figure 3D:
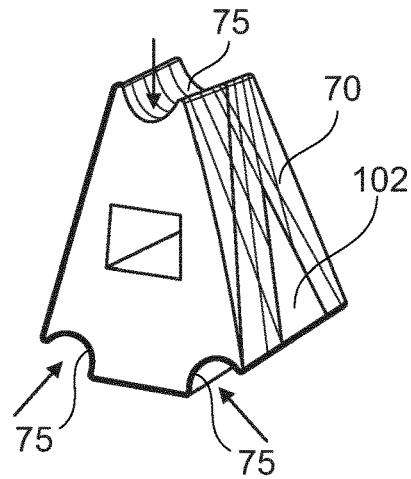

FIG. 3b shows the core device 100 after a number of windings of the carbon fiber string 800 have been applied to form the inner primary layer 70, using the facility generally shown in FIG. 2b. At this point the winding procedure is interrupted and the spacer devices 200 are removed, as shown by the arrow in FIG. 3c, leaving outwardly bulging portions of the inner primary layer 70 where the spacer devices 200 were before, and/or spanning across the recesses 110, 120, 130, as shown in FIG. 2b. Using a tool (not shown) the outwardly bulging portions 75 of the inner primary layer 70 is now pressed into the recesses 110, 120, 130, as shown by the arrows in FIG. 3*d*, whereby the inner primary layer 70 not only contacts a core device 100 periphery part defining the sides of the core device 100 but also the periphery part defining the bottom of the recesses 110, 120, 130 of the core device 100.

Figure 3E:
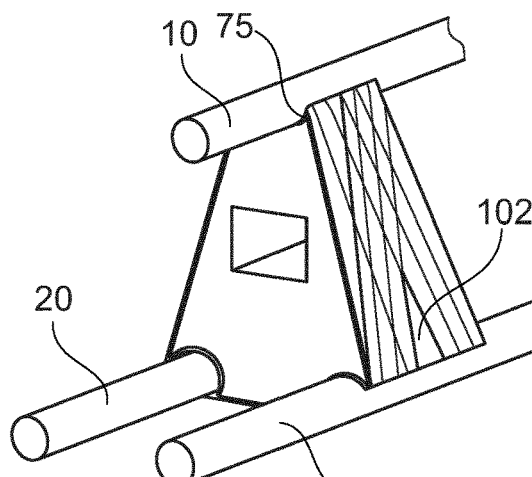
Figure 3F:
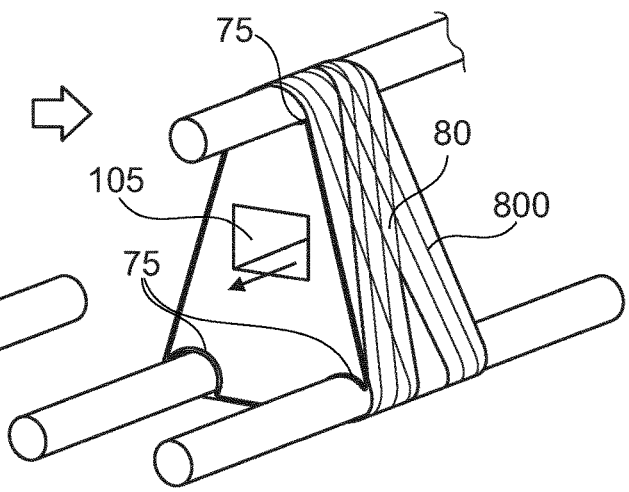

The prefabricated carbon fibre tubes 10, 20, 30 that are to form the structure 1 together with the unifying structure 40, are then placed into a respective recess 110, 120, 130, on top of those portions of the inner primary layer 70 that previously formed the aforementioned outwardly bulging portions 75, as shown in FIG. 3*e*, and the winding procedure is initiated again to form now the outer primary layer 80. Ending the process a film may be over-winded to ensure compression of the primary layers 70, 80 during subsequent curing.

After curing of the epoxy resin or other polymer matrix, such as for 2-4 hours, the axle (not shown in FIGS. 3*a*-3*f*) and the plurality of core device 100 each carrying a respective unifying structure 40 are then removed, leaving a light weight structure 1 as shown in FIG. 1*a*. A subsequent, additional curing may take place, such as by then placing the structure 1 in an oven for about 24 hours at a temperature of, eg., 80° C.

While the invention is discussed herein in the context of agricultural sprayer sections made using carbon fiber tubes, the uniting structure 40 and the method disclosed herein may also be applied for other tubes made from other types of fibers, or even with metal tubes.

A carbon fiber string as mentioned herein may include carbon fibers STS and Toray T700, or Granoc CN600 using PR102/EM100 epoxy resins from GRM Systems as the matrix.

The invention claimed is:

1. A carbon fiber boom structure for an agricultural sprayer boom, said carbon fiber boom structure having a length and comprising:
   an elongated upper carbon fiber tube;
   at least one elongated lower carbon fiber tube; and
   a plurality of carbon fiber/resin matrix uniting structures spaced apart along said length, each of said plurality of carbon fiber/resin matrix uniting structures bonded to each of said elongated upper carbon fiber tube and said at least one elongated lower carbon fiber tube to hold said elongated upper carbon fiber tube and said at least one elongated lower carbon fiber tube in a spaced apart position along said length, each of said plurality of carbon fiber/resin matrix uniting structures being formed in a winding operation by applying windings of a carbon fiber string with a liquid resin around portions of said elongated upper carbon fiber tube and said at least one elongated lower carbon fiber tube;
   for each of said plurality of carbon fiber/resin matrix structures, said windings and said carbon fiber/resin matrix uniting structure defining an inner primary layer and an outer primary layer of said carbon fiber/resin matrix uniting structure, wherein a portion of said inner primary layer is bonded to a surface portion of each of said elongated upper carbon fiber tube and said at least one elongated lower carbon fiber tube that is oriented towards an inside of said carbon fiber/resin matrix uniting structure while a portion of said outer primary layer is bonded to a remaining surface portion of each of said elongated upper carbon fiber tube and said at least one elongated lower carbon fiber tube to completely, or essentially completely, envelope each of said elongated upper carbon fiber tube and said at least one elongated lower carbon fiber tube by said portion of said inner primary layer and said portion of said outer primary layer.

2. The carbon fiber boom structure of claim 1, comprising one upper carbon fiber tube and two lower carbon fiber tubes, said two lower carbon fiber tubes extending parallel to one another.

3. The carbon fiber boom structure of claim 1, said inner primary layer and said outer primary layer being bonded to each other along portions of said windings between said elongated upper carbon fiber tube and said at least one elongated lower carbon fiber tube.

4. The carbon fiber boom structure of claim 1, said carbon fiber string being laid out for each of said windings to cross over portions thereof previously laid out.

5. The carbon fiber boom structure of claim 1, said carbon fiber/resin matrix uniting structure comprising two opposite pairs of legs, wherein legs of each of said two opposite pairs of legs converging towards said elongated upper carbon fiber-tube and being spaced apart at said at least one elongated lower carbon fiber tube.

6. A method of making a carbon fiber boom structure having a length and comprising:
   an elongated upper carbon fiber tube;
   at least one elongated lower carbon fiber tube; and
   a plurality of carbon fiber/resin matrix uniting structures spaced apart along said length, each of said plurality of carbon fiber/resin matrix uniting structures bonded to each of said elongated upper carbon fiber tube and said at least one elongated lower carbon fiber tube to hold said elongated upper carbon fiber tube and said at least one elongated lower carbon fiber tube in a spaced apart position along said length, each of said carbon fiber/resin matrix uniting structures being formed in a winding operation by applying windings of a carbon fiber string with a liquid resin around portions of said elongated upper carbon fiber tube and said at least one elongated lower carbon fiber tube;
   for each of said plurality of carbon fiber/resin matrix structures, said windings and said carbon fiber/resin matrix uniting structure defining an inner primary layer and an outer primary layer of said carbon fiber/resin matrix uniting structure, wherein a portion of said inner primary layer is bonded to a surface portion of each of said elongated upper carbon fiber tube and said at least one elongated lower carbon fiber tube that is oriented towards an inside of said carbon fiber/resin matrix uniting structure while a portion of said outer primary layer is bonded to a remaining surface portion of each of said elongated upper carbon fiber tube and said at least one elongated lower carbon fiber tube to completely, or essentially completely, envelope each of said elongated upper carbon fiber tube and said at least one elongated lower carbon fiber tube by said portion of said inner primary layer and said portion of said outer primary layer, the method comprising:
      providing a core device having a periphery with a plurality of elongated recesses, each of said plurality of recesses configured for receiving one of said elongated upper carbon fiber tube and said at least one elongated lower carbon fiber tube;
      providing a supply of said carbon fiber string with a liquid resin;
      positioning one or more spacer devices along said periphery;
      winding said carbon fiber string with said liquid resin around said core device with said one or more spacer devices to form said inner primary layer, with portions of said inner primary layer bridging said plurality of elongated recesses;

removing said one or more spacer devices;

pressing said portions of said inner primary layer into said plurality of elongated recesses;

positioning said elongated upper carbon fiber tube and said at least one elongated lower carbon fiber tube in a respective one of said plurality of elongated recesses with a first surface portion of each of said elongated upper carbon fiber tube and said at least one elongated lower carbon fiber tube bearing against a respective one of said portions of said inner primary layer;

winding said carbon fiber string around said inner primary layer and second surface portions of said elongated upper carbon fiber tube and said at least one elongated lower carbon fiber tube to form said outer primary layer;

curing said resin to bond said inner primary layer and said outer primary layer to each other and to said first surface portion and said second surface portions;

before or after said curing removing said core device.

7. The method of claim 6, comprising longitudinally displacing said supply back and forth relative to said core device during said winding for said carbon fiber string to cross over portions thereof previously laid out during said winding.

8. The method of claim 6, wherein a fixture with said core device is rotated for said winding, said carbon fiber string being simultaneously unwound from said supply, said carbon fiber string being dipped into said liquid resin to apply a coating thereon.

9. The method according to claim 6, wherein one of said one or more spacer devices is positioning in each of said plurality of elongated recesses.

10. The method according to claim 6, wherein a slip agent is applied to said one or more spacer devices and to said plurality of elongated recesses.

* * * * *